United States Patent [19]

Sisler

[11] Patent Number: 5,002,383

[45] Date of Patent: Mar. 26, 1991

[54] POLYPRISMATIC LENS FOR ENHANCING HUMAN OCULAR MOTILITY

[76] Inventor: Hampson A. Sisler, 34 W. 12th St., New York, N.Y. 10011

[21] Appl. No.: 377,897

[22] Filed: Jul. 10, 1989

[51] Int. Cl.⁵ .......................... G02C 7/14; G02B 3/08
[52] U.S. Cl. .................................... 351/175; 350/452; 351/168
[58] Field of Search ................ 351/175, 168; 350/452

[56] References Cited

U.S. PATENT DOCUMENTS

| | | | |
|---|---|---|---|
| 3,004,470 | 10/1961 | Ruhle | 350/452 X |
| 3,423,151 | 1/1969 | White | 351/175 |
| 3,549,302 | 12/1970 | Fraige | 351/175 |
| 3,628,854 | 12/1971 | Jampolsky | 351/175 |
| 4,163,655 | 8/1979 | Campbell | 350/170 |
| 4,247,179 | 1/1981 | Daniels et al. | 351/171 |
| 4,288,149 | 9/1981 | Campbell | 351/170 |
| 4,427,272 | 1/1984 | Gernet | 351/173 |
| 4,484,804 | 11/1984 | Mignen | 351/168 |
| 4,606,626 | 8/1986 | Shinohara | 351/175 |

FOREIGN PATENT DOCUMENTS 446129 7/1951 Italy .

OTHER PUBLICATIONS

Introduction to the Theory of Spectacles; Henker, O.; Jena School of Optics, 1924.

*Primary Examiner*—Scott J. Sugarman
*Attorney, Agent, or Firm*—Kane, Dalsimer, Sullivan, Kurucz, Levy, Eisele and Richard

[57] ABSTRACT

A device for enhancing the range of vision of a person with low eye motility which includes a plurality of parallel or concentric prisms with bases disposed paracentrically on a transparent medium. The prisms cooperate to enhance the angle of vision of the person as he moves the eye over a small angle, and simultaneously improves the aesthetic appearance of the person by increasing the apparent movement of the eye, as seen by an observer of persons with an artificial eye, which moves less than normally.

14 Claims, 3 Drawing Sheets

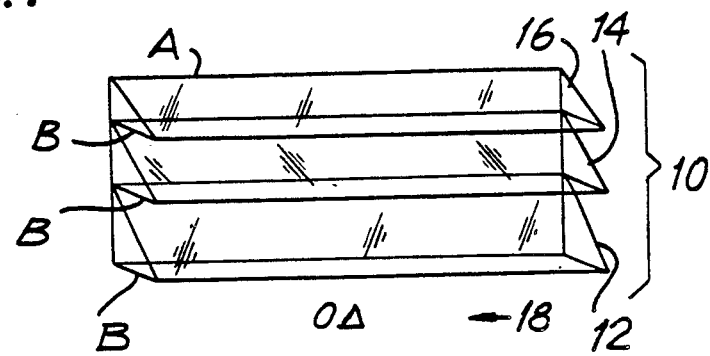
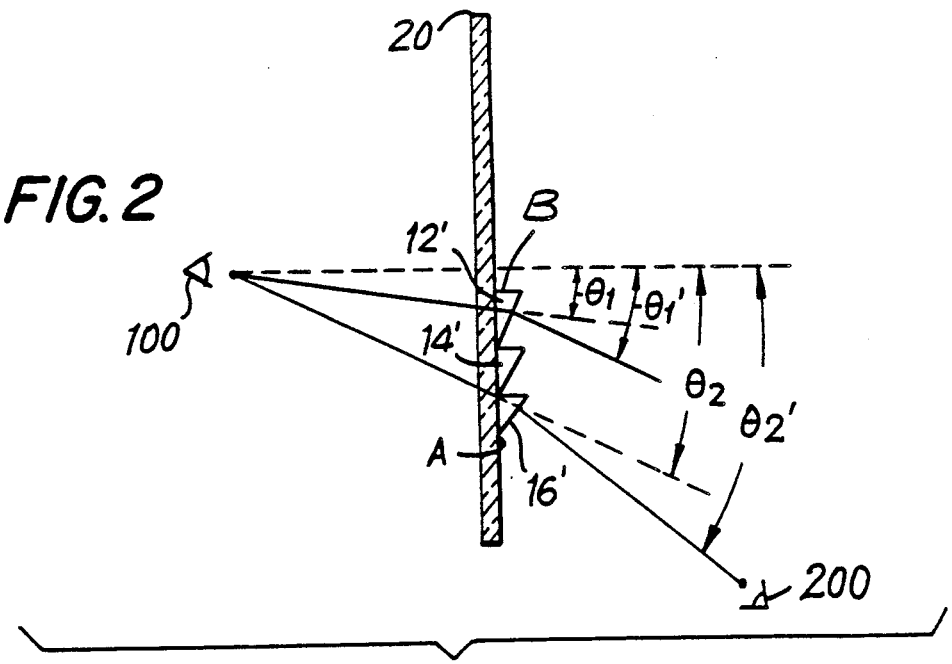
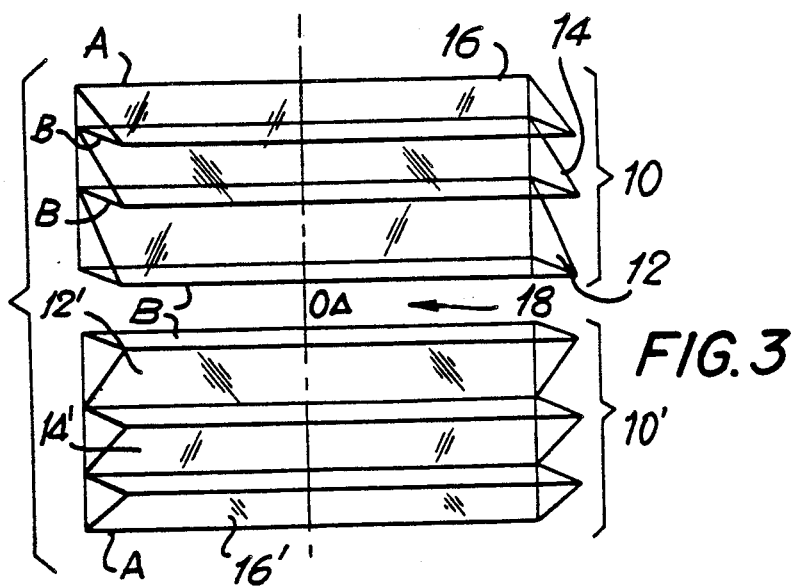

POLYPRISMATIC LENS FOR ENHANCING HUMAN OCULAR MOTILITY

BACKGROUND OF THE INVENTION a. Field of Invention

This invention pertains to a polyprismatic lens and, more particularly, to a lens having a plurality of parallel prisms. The power of the prisms is increased from a central portion of the lens towards the periphery. The lens is useful for enhancing the actual or apparent effect of eye movement of a wearer.

b. Description of the Prior Art

The motility of an eye (the ability of a person to move his/her eye) is frequently affected by various pathological causes such as extra-ocular muscle disease or by motor nerve innervational deficiency. Persons having this problem have in effect a reduced range of eye movement and have trouble directing the affected eye toward objects which do not lie directly in front of them. In most situations, these persons must turn their heads in order to bring the objects into their central vision. Furthermore, if this condition affects only one eye, the affected person's face and appearance becomes unsymmetrically and aesthetically displeasing. This latter factor is also applicable to people who lost an eye and must wear a prosthesis. Usually, because of either retained extra-ocular muscle dysfunction or cicatricial restrictive reasons, the prosthesis device may be hard or impossible to move beyond a small angle.

Until the present invention, there were no devices which could enhance small eye movement satisfactorily. For example, in U.S. Pat. No. 3,423,151, E.B. White discloses a pair of glasses with a prism secured to the frame for extending the field of vision of the wearer. However, this approach is useful only for a small number of patients because it requires the ability to look sideways. Furthermore, it does not improve the aesthetic appearance of the wearer.

OBJECTIVES AND SUMMARY OF THE INVENTION

An objective of the present invention is to provide a device which increases the effective range of eye movement of a wearer.

A further objective is to provide a device which may be mounted on or incorporated into eye glasses already worn by a person, thereby reducing overall expenses.

A further objective is to provide a device which improves the aesthetic appearance of a person by enhancing his apparent eye movement.

Other objectives and advantages of the invention shall become apparent from the following description of the invention. Briefly, a device constructed in accordance with this invention comprises a plurality of prisms disposed on a transparent medium such as a lens. The prisms are preferably disposed paracentrically with respect to a neutral central portion of the lens. The power of the prisms is gradually increased from the center outwardly, thereby enhancing the eye movement of a wearer and increasing his effective arc of scanning. The prisms may be disposed in parallel to each along an axis extending in a preselected direction, such as a vertical or horizontal direction. Prisms oriented along different axes may be optically superimposed. Alternatively, the prisms may be arranged concentrically around the neutral region of the lens.

BRIEF DESCRIPTION OF THE FIGURES

FIG. 1 shows a plan view of a set of parallel prisms of increasing power in accordance with the invention;

FIG. 2 shows a side view of the prisms of FIG. 1 mounted on a lens to illustrate their method of operation;

FIG. 3 shows two sets of parallel prisms extending oppositely in direction with the lowest powered units being central whereas the highest powers being at the top and the bottom;

DETAILED DESCRIPTION OF THE INVENTION

Figure 4:
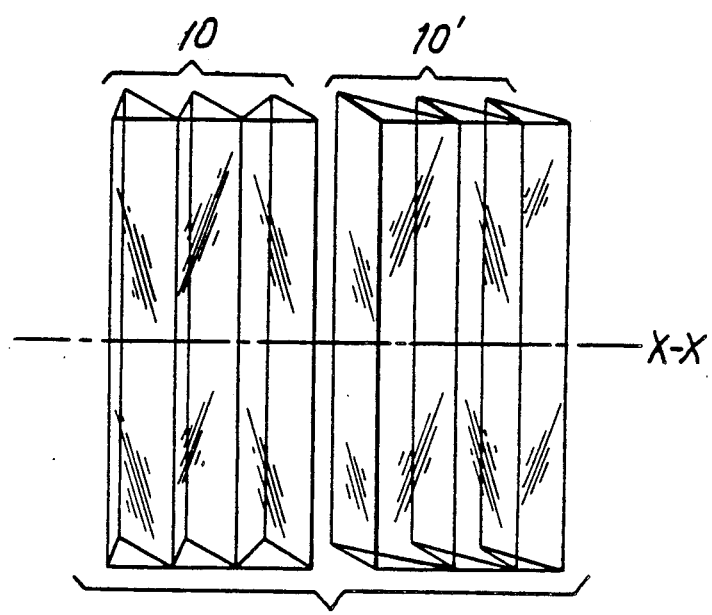
FIG. 4 shows a set of prisms arranged in accordance with this invention along a horizontal axis the highest powered units being outermost on both sides.

A set of prisms arranged in accordance with this invention is shown in FIG. 1. In this Figure, the set 10 includes three prisms 12, 14, 16 disposed vertically adjacent to an optically neutral region 18. Preferably, the prisms are spaced evenly, and the power of each prism is increased as its distance increases from the neutral region. For example, in FIG. 1, prim 12 may power of 10Δ (diopters), prism 14 a power of 20Δ, and prism 16 a power of 30Δ. Each prism has a base B around which the light is bent by the prism, and an apex A opposite base B. FIG. 2 illustrates the advantages of this arrangement. Set 10 is mounted on a lens 20 which is placed in front of an eye 100 of a person, with neutral area disposed substantially along the optical axis 0 of eye 100, with base B lying perpendicular to lens 20. Each prism is oriented so its base is the closest element of the prism to the axis 0, and apex A is disposed away from the axis. In other words, the bases of the prisms face the center of the lens 20. FIG. 2 is provided mainly to illustrate the invention. Therefore, the lens 20 can be assumed to be a planar lens. However, it should be understood that the lens may have other optical characteristics selected for correction of defects of the eye 100. Now, if the wearer moves his eye 100 to shift his direction of gaze to angle $\theta_1$, light passing through prism 10 is refracted so that his direction of looking is increased to intercept objects an at angle $\theta_1'$. Without prism 12, the angle of gaze of the person is limited to $\theta_1$. Similarly, if the wearer moves his eye more to shift his direction of gaze to angle $\theta_2$, his field of vision is increased to $\theta_2'$ by prism 16. Because of the increase of power of prism 16 compared to prism 12, the angle of scanning is increased proportionally. Thus, FIG. 2 illustrates how prism 10 can increase the effective range of visual direction of the wearer, and how a relatively small eye movement can result in a greater field of gaze then with normal lenses.

Importantly, the arrangement shown in FIGS. 1 and 2 also improve the aesthetic appearance of the wearer. When the wearer moves his eye by angle $\theta_2$, with the prisms, it will appear to observers, that the eye movement covered an angle of $\theta_2'$. Thus, the prisms give the appearance that a person moved his eye much more than he actually did. This latter effect is especially important for wearers of prosthetic artificial eyes, which always move less than the normal amount. As explained before, these persons usually have very limited eye movement.

Preferably, as shown in FIG. 3, the set of prisms includes a second group of prisms 10' being arranged symmetrically opposite the first group 10. The prisms are arranged in parallel to each other and perpendicular to an axis. This axis (Y—Y) may be vertical as shown in FIG. 3, if it is desired to enhance the range of eye movement in a vertical plane. The prisms are preferably arranged symmetrically with respect to neutral area 18. Thus, prisms 12 and 12' have lower power (such as 10Δ), prisms 14 and 14' have a higher power (20Δ) and prisms 16 and 16' have the highest power (30Δ) with all prisms arranged with their bases directed toward the neutral, central area. It should be understood that for purposes of clarity only three prisms are shown for each set, however it should be understood that this number can be increased or decreased. Alternatively, the prisms may be arranged symmetrically along a horizontal axis (X—X) as shown in FIG. 4. This arrangement provides an increased amplitude of eye movement in a horizontal direction.

Figure 5:
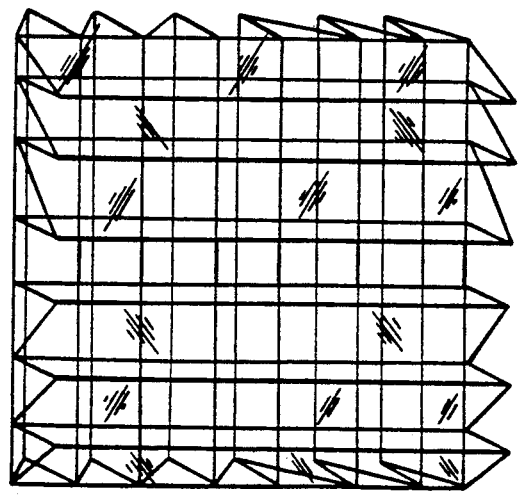
FIG. 5 shows the prisms of FIGS. 3 and 4 superimposed optically.
Figure 6:
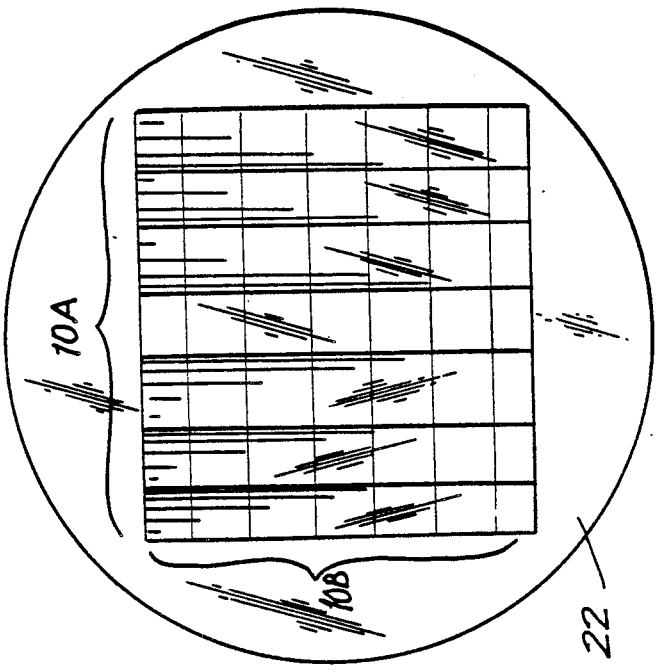
FIG. 6 shows a plan view of the prisms of FIG. 5 mounted on a lens.
Figure 7:
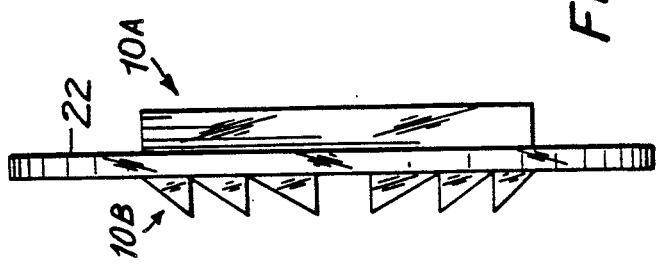
FIG. 7 shows a side sectional view of the prisms and lens of FIG. 6.

Two symmetrical sets of prisms arranged along orthogonal axes may also be superimposed optically to obtain the arrangement shown in FIG. 5. This arrangement not only increases the field of vision along both the horizontal and vertical planes but because of the combined effect of the two sets of prisms, it also enhances diagonal eye movement, i.e. eye movement at an angle with respect to either the horizontal or vertical plane. From a mechanical view point, it is difficult to provide orthogonal prisms on the same side of a lens. Therefore, it is preferable to have one set of prisms 10A, 10' on one side of the lens and a different set of prisms 10B orthogonal to the first set, disposed on the other side of a lens 22. This arrangement is shown in FIGS. 6 and 7.

Figure 8:
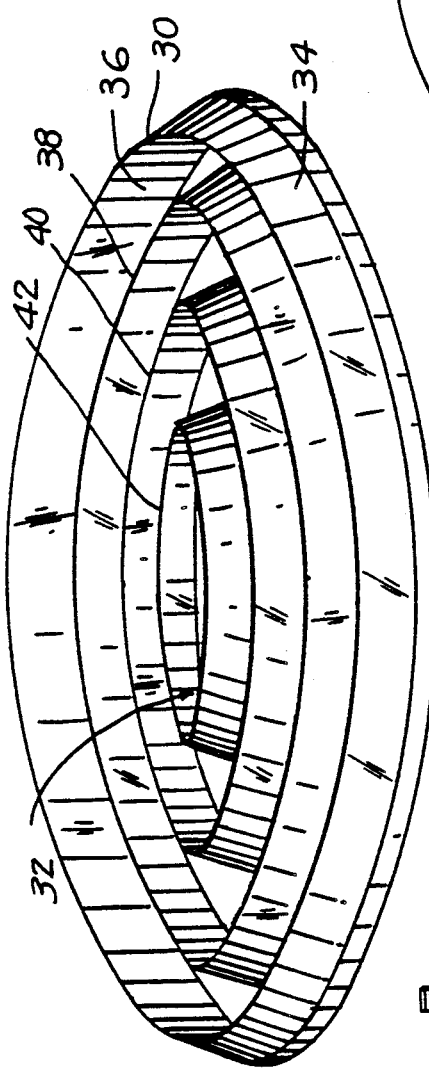
FIG. 8 shows an isometric view of a plurality of circular prisms disposed concentrically on a lens, with base directed centrally and power increasing toward the periphery.

In a somewhat preferred embodiment of the invention, instead of being parallel, the prisms may be formed as concentric, circular or toroidal prisms (FIG. 8) surrounding an optical neutral center 32, about 2mm in diameter. In this arrangement each prism of a series has a base 34 arranged circumferentially to center 32, with a conical slope 36 extending away from the center as shown. This arrangement has the same effect as the two-dimensional arrangement shown in FIGS. 6 and 7 but, it is simpler to make and is disposed on the same side of a lens.

As previously mentioned, the optical power of each prism is generally proportional to its distance from the neutral zone. This optical power may range from 5 to 60Δ. If small prisms are used, then the prisms may be partitioned in subgroups, each subgroup having a preselected optical power. For example, in FIG. 8, prisms 38, 40 and 42 may belong to the same subgroup, and have the same optical power. Prism 30 (and other prisms not shown for the sake of clarity) belongs to a next subgroup having a higher optical than prisms 38, 40 and 42. The optical power of adjacent subgroups may be increased in regular increments of, for example 5Δ.

The prisms may be formed in any well known manner in the art. For example, the prisms may be cut simultaneously with the lens. Thus, the prisms and the lens may be made of glass, a plastic material or other transparent medium. Alternatively, the prisms may be made separately and then secured to the lens with an adhesive.

Obviously, numerous modifications may be made to the invention without departing from its scope as defined in the appended claims.

I claim:

1. A device for enhancing a range of scanning movements of a person's eye comprising:
 a transparent medium having a center with a neutral region; and
 a plurality of prisms spaced paracentrically with respect to said center, said plurality of prisms including a first and a second prism, each being disposed at a first and a second distance from said center, and each having a first and second optical power respectively, said first distance being smaller than said second distance, and said first optical power being smaller than second optical power, said prisms having bases, said prisms being oriented with the bases facing the said center.

2. The device of claim 1 wherein said prisms are parallel to each other.

3. The device of claim 1 wherein said prisms are disposed perpendicular to an axis passing through said center.

4. The device of claim 1 wherein said plurality of prisms comprises a first group of parallel prisms, and a second group of parallel prisms oriented at an angle with respect to said first group.

5. The device of claim 4 wherein said second group of prisms is perpendicular to said first group of prisms.

6. The device of claim 4 wherein said medium includes a first and second surface, said first group being disposed on said first surface, and said second group being disposed on said second surface.

7. The device of claim 1 wherein said prisms are toroidal prisms arranged concentrically around said center.

8. The device of claim 1 wherein said plurality of prisms are arranged in subgroups, each subgroup comprising prisms sequentially spaced from said center having the same optical power.

9. A device for enhancing the field of vision of a person's eye comprising:
 a lens having a central neutral region; and
 a plurality of prisms disposed on said lens, each prism having a base and being oriented with said base facing said neutral region, said plurality of prisms consisting of prism sets disposed symmetrically with respect to said neutral region at preset distances therefrom, each set of prisms having an optical power, with sets of prisms disposed closer to the neutral region having smaller powers than sets of prisms disposed further from said neutral region.

10. The device of claim 10 wherein said plurality of prisms includes a first and a second group of prisms, said first group being disposed perpendicularly to a first axis passing through said center, and said second group of prisms is disposed perpendicularly to a second axis passing through said center at an angle with respect to said first axis.

11. The device of claim 10 wherein said first and second axes are perpendicular.

12. The device of claim 10 wherein lens has a first surface and a second surface opposite said first surface, and wherein said first group of prisms is disposed on said first surface, and said second group of prisms is disposed on said second surface.

13. The device of claim 9 wherein said prisms are toroidal prisms formed concentrically around said center.

14. A device for enhancing the motility of a person's eye comprising:

a lens having a central neutral region; and a plurality of optical elements disposed symmetrically with respect to said neutral region; each element having a base facing said neutral region, and an optical power, the optical power of the optical elements increasing with the distance of the elements with respect to said neutral region to increase the angle visible to the person as the person shifts his eye from said neutral region.

* * * * *